United States Patent [19]

Loftin et al.

[11] Patent Number: 5,470,904
[45] Date of Patent: Nov. 28, 1995

[54] PERMANENT AQUEOUS MARKER INKS

[75] Inventors: Rachel M. Loftin, Halifax; Kimberly B. Sanborn, South Weymouth, both of Mass.

[73] Assignee: The Gillette Company, Boston, Mass.

[21] Appl. No.: 190,287

[22] Filed: Feb. 2, 1994

Related U.S. Application Data

[60] Division of Ser. No. 968,001, Oct. 28, 1992, which is a continuation-in-part of Ser. No. 917,455, Jul. 21, 1992, abandoned.

[51] Int. Cl.$^6$ .............. C08K 5/02; C09D 11/00; C09D 13/00
[52] U.S. Cl. ............ 524/462; 524/263; 524/463; 106/19 A; 106/19 R; 106/20 C; 106/20 D; 106/32
[58] Field of Search .............. 524/261, 264, 524/267, 462, 463, 375, 508, 263; 106/19 A, 19 R, 20 C, 20 D, 20 R, 32

[56] References Cited

U.S. PATENT DOCUMENTS

| | | | |
|---|---|---|---|
| 3,085,912 | 4/1963 | Friese | 427/559 |
| 3,948,668 | 4/1976 | Hayek et al. | 106/22 |
| 4,108,782 | 8/1978 | Thompson | 252/8.55 |
| 4,221,601 | 9/1980 | Augustin et al. | 106/171 |
| 4,545,818 | 10/1985 | Inoue et al. | 106/22 |
| 4,711,802 | 12/1987 | Tannenbaum | 428/207 |
| 4,762,875 | 8/1988 | Gold | 524/248 |
| 4,853,037 | 8/1989 | Johnson et al. | 106/22 |
| 4,880,565 | 11/1989 | Rose et al. | 252/355 |
| 5,019,166 | 5/1991 | Schwarz | 106/22 |
| 5,089,050 | 2/1992 | Vieira et al. | 106/20 |
| 5,106,416 | 4/1992 | Moffatt et al. | 106/20 |
| 5,106,417 | 4/1992 | Hauser et al. | 106/20 |
| 5,114,479 | 5/1992 | Keaverney et al. | 106/30 |
| 5,131,776 | 7/1992 | Mott | 401/198 |

FOREIGN PATENT DOCUMENTS

| | | |
|---|---|---|
| 0044378A1 | 1/1982 | European Pat. Off. |
| 0264897A2 | 4/1988 | European Pat. Off. |
| 0294044A1 | 12/1988 | European Pat. Off. |
| 0337705A2 | 10/1989 | European Pat. Off. |
| 0439026A2 | 7/1991 | European Pat. Off. |
| 0304887B1 | 5/1992 | European Pat. Off. |
| 0322805B1 | 5/1992 | European Pat. Off. |
| 3024646 | 12/1981 | Germany. |
| 59-120667 | 7/1984 | Japan. |
| 1337467 | 11/1973 | United Kingdom. |
| WO88/00961 | 2/1988 | WIPO. |

OTHER PUBLICATIONS

Dow Corning Wright Corporation; Midland, Mich.; New Product Information Brochure re: Superwetting Agents.
DuPont Chemicals; Material Safety Data Sheet; "'Zonyl' FSN Fluorosurfactant" (Jan. 15, 1992).
3M, Industrial Chemical Products Divison; Fluorad™ Technical Information, "Fluorochemical Surfactants", Fluorad™ Fluorochemical Surfactant FC–171; (Sep. 1987).
Rohm and Haas Company, Philadelphia, Pa.; "Polymers, Resins and Monomers", Trade Sales (1986).
Brochure re: "Selecting and Evaluating Fluorosurfactants Criteria for Surfactant Selection".
Union Carbide Chemicals and Plastics Company, Inc., Industrial Chemicals Division, Danbury, Conn.; Triton Surfactants, "Triton® Nonionic Surfactant X–100".

*Primary Examiner*—Paul R. Michl
*Assistant Examiner*—LaVonda R. DeWitt
*Attorney, Agent, or Firm*—Fish & Richardson

[57] ABSTRACT

Permanent aqueous marker inks are provided which include surfactant, a pigment, a film-forming polymer, and water. The surfactant may be a combination of a hydrocarbon, preferably an alkylphenol ethyoxylate and a fluorocarbon, or it may be a silicone.

17 Claims, No Drawings

PERMANENT AQUEOUS MARKER INKS

BACKGROUND OF THE INVENTION

This is a divisional of copending application Ser. No. 07/968,001, filed Oct. 28, 1992 pending which is a continuation in part of U.S. Ser. No. 07/917,455, filed Jul. 21, 1992, abandoned.

This invention relates to marking compositions.

Traditionally, permanent inks for use in markers have been provided in liquid form, as solvent-based or aqueous solutions. Solvent-based inks generally provide good adhesion and wetting on a wide variety of smooth, difficult to wet substrates, e.g., glass, plastic and metal. However, there is an increasing desire in the field to reduce or eliminate solvent use, due to environmental and safety concerns, and, secondarily, to avoid the unpleasant odor of solvent-based inks. Aqueous inks, formulated to replace solvent based inks, generally do not wet all substrates, particularly plastics, glass and metal, and are often not water-fast.

SUMMARY OF THE INVENTION

The invention features permanent aqueous marker inks that can be used to mark, e.g., paper, plastics, glass, and metal.

One aspect of the invention features an aqueous marker ink which includes a hydrocarbon surfactant, a fluorocarbon surfactant, a pigment, a film-forming acrylic polymer, and water. In preferred compositions, the acrylic polymer is provided in the form of an emulsion, and the acrylic is a thermoplastic acrylic, more preferably polymethyl methacrylate. Preferably, the hydrocarbon and fluorocarbon surfactants are provided in a weight ratio of about 1:1.

In another aspect, the invention features an aqueous marker ink which includes an alkylphenol ethoxylate surfactant, a fluorocarbon surfactant, a pigment, a film-forming polymer, and water. In preferred compositions, the alkylphenol ethoxylate surfactant is an octylphenol ethoxylate.

In a third aspect, the invention features an aqueous marker ink which includes a silicone surfactant, a film-forming polymer, a pigment, and water. In preferred compositions, the silicone surfactant is a siloxane or silane surfactant and the silicone surfactant is fluorinated. The compositions may further include a fluorocarbon and/or a hydrocarbon surfactant.

Preferred inks include, by weight, about 0.1 to 1, more preferably 0.2 to 0.6 percent of the surfactant(s), about 10 to 40, more preferably 20 to 30 percent of the film-forming polymer, about 2 to 8 percent pigment, and sufficient water to provide a viscosity of less than about 20 cps. The ink may also include a small quantity (preferably 1–10%) of a low (less than 5) carbon alcohol.

The invention also features a method of marking a substrate, e.g., glass, plastic or metal. The method includes the steps of providing a marker having a reservoir, the reservoir containing one of the featured inks, and making a mark with the marker on the substrate.

Preferred marker inks advantageously do not include any solvent The term "solvent", as used herein, refers to liquids which are defined as Volatile Organic Compounds (VOCs). Further, they are permanent, i.e., water-fast and fade resistant, and write well on a wide variety of substrates, including difficult to wet substrates such as glass, metal, and plastics, e.g., polypropylene, polyethylene and PVC film (SARAN film). Preferred inks have a surface tension of from about 18 to 34 dynes/cm.

Other features and advantages of the invention will be apparent from the Description of the Preferred Embodiments thereof, and from the claims.

DESCRIPTION OF THE PREFERRED EMBODIMENTS

Preferred marker inks include a surfactant, or combination of surfactants, to reduce the surface tension of the ink composition to less than about 35 dynes/cm, an acrylic film forming polymer, a water-dispersible pigment, a humectant, and water.

The surfactant(s) can be either: (a) a combination of fluorocarbon and hydrocarbon surfactants, (b) a silicone surfactant, or (c) a combination of a silicone surfactant and a fluorocarbon surfactant and/or a hydrocarbon surfactant. The total amount of the surfactant in the composition is preferably from about 0.1 to 1, more preferably 0.2 to 0.6 percent by weight. It is preferred that the amount of the surfactant(s) included, and the ratio of surfactants, if a combination is used, be selected so as to provide a composition having a surface tension between about 18 and 34 dynes/cm. Too little surfactant(s) may prevent the composition from properly wetting difficult substrates, while too much may cause the ink to "soak through" when used on paper.

In the embodiments in which a combination of fluorocarbon and hydrocarbon surfactants is used, the ratio of fluorocarbon surfactant to hydrocarbon surfactant is preferably about 1:1.

Suitable fluorocarbon surfactants include at least one aliphatic fluorocarbon group. Preferred fluorocarbon surfactants include ZONYL FSA and FSN fluorosurfactants, available from Dupont, which contain, respectively, lithium 3, [(1H,1H,2H,2H-fluoroalkyl)thio]proprionate and telomer B monoether with polyethylene glycol (CAS No. 65545-80-4). Other suitable surfactants are fluorinated alkyl alkoxylates, available from 3M under the tradename FLUORAD, e.g., FLUORAD FC-171 surfactant.

Hydrocarbon surfactants include at least one aliphatic group. Suitable hydrocarbon surfactants include alkylphenol ethoxylates in which the alkyl group has between 6 and 12 carbons. The preferred alkylphenyl ethoxylate is octylphenol ethoxylate, e.g., TRITON® X-100 non-ionic surfactant, available from Union Carbide, Danbury, Conn.

Suitable silicone surfactants include, silanes and siloxanes. Examples are polyoxyethylene modified polydimethylsiloxanes (referred to in the art as "silicone glycol copolymers"), e.g., DOW CORNING® Q2-5211 and Q2-5212 super-wetting agents, available from Dow Corning Corp., Midland, MI. Also preferred are fluorinated silicone surfactants, e.g., fluorinated polysilanes, available from Ecology Chemical Co., Watertown Mass., under the tradename LEVELENE 100.

The choice of surfactant will depend upon the properties desired from the ink, and cost and stability factors. Typically, the hydrocarbon/fluorocarbon combination provides wetting properties that are stable over a long storage period, while the silicone surfactant provides good wetting and allows the use of a single surfactant.

Enough pigment should be included in the ink to provide an adequate color intensity, but not so much that viscosity becomes excessively high. The preferred inks include between approximately 2% and 8% pigment by weight, more preferably between approximately 5% and 7%. Pigments that may be used in the invention include water dispersible pigments, and preferably the pigment is provided in the form of an aqueous dispersion, for accurate measurement and uniform mixing. Suitable dispersions include those available from Hoechst Celanese under the tradename FLEXONYL or HOSTAFINE, those available from KVK U.S.A. Inc. under the tradename PREDISOL, those available from Heucotech Ltd. under the tradename HEUCOSPERSE, those available from Nippon Keiko Kagaku, Ltd. under the tradename LUMIKOL, and those available from Mikuni Color Works, Inc. under the tradename TITICACA. The total amount of the pigment dispersion to be added will depend upon the solids level of the dispersion, and will be selected to give an effective amount of the pigment, as described above. It is preferred that the pigment have a relatively small particle size, preferably less than 0.5 micron, to prevent settling. The small particle size also is more suitable for use in capillary feed markers.

The acrylic polymer is preferably provided in the form of an emulsion. However, if desired, a water soluble acrylic may be used. Preferred acrylic polymers include thermoplastic acrylics, e.g., polymethacrylates, such as polymethyl methacrylate and other methyl acrylates. A preferred acrylic emulsion is RHOPLEX® AC-261 emulsion, available from Rohm and Haas Co., Philadelphia, Pa. Rhoplex AC 261 is an all-acrylic co-polymer combination, a butyl acrylate/methyl methacrylate blend having a low acid content, a molecular weight of around 1,000,000 and a glass transition temperature of between 15 and 20. The resin is thermoplastic and in use forms a film on the substrate by coalescence after the correction fluid is applied. Preferred compositions contain from about 20 to 30 weight percent of the acrylic polymer. Too much of the acrylic may result in undesirably high viscosity at an effective level of pigment, while too little may result in an ink having poor water resistance when dry.

Preferred humectants are glycols, such as diethylene or dipropylene glycol or glycerol. A more preferred humectant is propylene glycol. The humectant prevents dry-out of the marker when the cap is left off. Accordingly, too much may cause the ink to dry too slowly, while too little may not prevent drying out of the marker. Preferred compositions include from 1 to 25 weight percent of the humectant, preferably from about 5 to 15 weight percent.

Other conventional ingredients may be included in the composition, e.g., biocides.

Sufficient water should be included in the ink so that its Brookfield viscosity at 25° C. is less than about 20 cps, more preferably between about 2 cps and 10 cps. If the viscosity is too low, the composition may not contain effective amounts of the active ingredients. If the viscosity is too high, the ink may be too thick for practical use, particularly in capillary feed systems.

A preferred procedure for preparing the compositions of the invention is to provide the pigment in the form of a dispersion, add to this dispersion the super-wetting surfactant (if a blend of surfactants is used, these are preferably mixed prior to addition to the pigment dispersion), then add the humectant, the water, and, finally, the acrylic emulsion, mixing between each addition. The ingredients can be mixed using any conventional mixer, under conditions of relatively low shear.

The following examples illustrate the invention.

EXAMPLE 1

A series of ink compositions were prepared using the preferred procedure described above. The formulations for these compositions are given in Table 1. Each ink was tested by forming a line on a series of substrates (PVC film (SARAN wrap), polyethylene, polypropylene, metal, glass and cellophane tape) and observing whether the line dried without shrinkage and/or beading. Each ink formed a uniform line, without beading or shrinkage, on each of the test substrates.

TABLE 1

| Ingredient | Sample # | | | | |
|---|---|---|---|---|---|
| | 1 | 2 | 3 | 4 | 5 |
| HOSTAFINE TS Pigment dispers'n | 15 | | | | |
| HOSTAFINE B-2G Pigment dispers'n | | 15 | | | |
| FLEXONYL ACB Pigment dispers'n | | | 10 | 10 | |
| FLEXONYL AB26 Pigment dispers'n | | | | | 10 |
| Propylene Glycol | 10 | 10 | 10 | 10 | 10 |
| TRITON X-100 hydrocarbon surf. | 0.25 | | | 0.5 | |
| ZONYL FSA fluorocarbon surf. | 0.25 | | | | 0.25 |
| SUPERWETTER Q2-5212 silicone | | 0.5 | | | |
| LEVELENE 100 hydrocarbon surf. | | | 1 | 0.5 | 0.5 |
| bacteriocide | 0.1 | 0.1 | 0.1 | 0.1 | 0.1 |
| RHOPLEX AC261 acrylic polymer | 50 | 50 | 50 | 50 | 50 |
| water | 24 | 24 | 29 | 29 | 29 |

OTHER EMBODIMENTS

Other embodiments are within the claim. For example, a small amount (less than 10%) of 2-propanol may be added to the ink to decrease the drying time. An example of such an ink is:

| Ingredients | Weight Percentage |
|---|---|
| Hostifine Black | 2 to 8% pigment weight |
| Propylene glycol | 2 to 10% |
| Rhoplex AC261 | 50% |
| Triton X-100 | 0.1 to 0.5% |
| Zonyl FSA | 0.1 to 0.5% |
| 2-Propanol | 2 to 10% |
| Suttocide A | 0.1% |

Water is added to make up the difference to 100%.

We claim:

1. A marker comprising
   a hollow tubular body defining an ink reservoir, the reservoir containing an ink comprising a silicone surfactant, a pigment, a film-forming polymer and water and
   a tip in fluid communication with said reservoir for delivering said ink to a substrate by capillary action.

2. An aqueous marker ink comprising a fluorinated silicone surfactant, a film-forming polymer, a pigment, and water.

3. An aqueous marker ink comprising a silicone surfactant, a surfactant selected from the group consisting of fluorocarbon surfactants, surfactants including at least one aliphatic group, and mixtures thereof, a film forming polymer, and water.

4. The marker of claim 1 wherein said ink comprises from about 0.1 to 1 percent of said silicone surfactant.

5. The marker of claim 4 wherein said ink comprises from about 0.2 to 0.6 percent of said silicone surfactant.

6. The marker of claim 1, 4 or 5 wherein said ink comprises from about 2 to 8 percent of said pigment, about 20 to 30 percent of said film-forming polymer, and sufficient water so that the Brookfield viscosity of the ink at 25° C. is less than about 20 cps.

7. The marker of claim 1 wherein said ink further comprises a humectant.

8. The aqueous marker ink of claim 2 wherein said ink comprises from about 0.1 to 1 percent of said fluorinated silicone surfactant.

9. The aqueous marker ink of claim 8 wherein said ink comprises from about 0.2 to 0.6 percent of said fluorinated silicone surfactant.

10. The aqueous marker ink of claim 2, 8 or 9 wherein said ink comprises from about 2 to 8 percent of said pigment, about 20 to 30 percent of said film-forming polymer, and sufficient water so that the Brookfield viscosity of the ink at 25° C. is less than about 20 cps.

11. The aqueous marker ink of claim 2 wherein said ink further comprises a humectant.

12. The aqueous marker ink of claim 3 wherein said ink comprises a total combined surfactant level of from about 0.1 to 1 percent.

13. The aqueous marker ink of claim 12 wherein said ink comprises a total combined surfactant level of from about 0.2 to 0.6 percent.

14. The aqueous marker ink of claim 3, 12 or 13 wherein said ink comprises from about 2 to 8 percent of said pigment, about 20 to 30 percent of said film-forming polymer, and sufficient water so that the Brookfield viscosity of the ink at 25° C. is less than about 20 cps.

15. The aqueous marker ink of claim 3 wherein said ink further comprises a humectant.

16. The aqueous marker ink of claim 15 wherein said ink comprises from about 1 to 25 percent of said humectant.

17. A method of marking a substrate including the steps of providing a marker having a reservoir, the reservoir containing an ink comprising a silicone surfactant, a pigment, a film-forming polymer, and water, and making a mark with said marker on the substrate.

* * * * *